United States Patent [19]

Lee

[11] Patent Number: 5,225,908
[45] Date of Patent: Jul. 6, 1993

[54] VIDEO SIGNAL RECORDING APPARATUS FOR ELECTRONIC CAMERA

[75] Inventor: Young-man Lee, Suwon, Rep. of Korea

[73] Assignee: Samsung Electronics Co., Ltd., Suwon, Rep. of Korea

[21] Appl. No.: 817,316

[22] Filed: Jan. 6, 1992

[30] Foreign Application Priority Data

Jan. 12, 1991 [KR] Rep. of Korea .................. 91-398

[51] Int. Cl.⁵ .................................................. H04N 5/04
[52] U.S. Cl. .................................... 358/149; 358/148; 358/181; 358/183
[58] Field of Search ............... 358/181, 183, 149, 148, 358/158, 153, 909

[56] References Cited

U.S. PATENT DOCUMENTS

| | | | |
|---|---|---|---|
| 4,853,781 | 8/1989 | Okano | 358/149 |
| 4,994,916 | 2/1991 | Pshtissky | 358/181 |
| 5,081,522 | 1/1992 | Hiroyuki | 358/183 |
| 5,111,490 | 5/1992 | Drawert | 358/183 |

Primary Examiner—James J. Groddy
Assistant Examiner—Sherrie Hsia
Attorney, Agent, or Firm—Robert E. Bushnell

[57] ABSTRACT

A video signal recording apparatus for an electronic camera comprises a system controller, a synchronous signal generator, a first video signal input source including at least a CCD, a second video signal input source, and a synchronous signal processor, whereby an input video signal can be written into a memory regardless of the video input source.

3 Claims, 4 Drawing Sheets

VIDEO SIGNAL RECORDING APPARATUS FOR ELECTRONIC CAMERA

BACKGROUND OF THE INVENTION

The present invention relates to a video signal recording apparatus for an electronic camera (or a digital still video camera), and more particularly to a video signal recording apparatus capable of recording an input video signal generated from a second video signal source without regard to input equipment.

Generally, an electronic camera is designed to photograph and record the image of an object by photoelectrically converting it with a charge-coupled device (CCD). Recently, an electronic camera was developed which digitizes a photographed video signal to write it into a detachable memory card composed of integrated circuits. Such an electronic camera is illustrated in FIG. 1.

When a user sets a photograph/write mode, a system controller 50 supplies a control signal to a synchronous signal generator 60. Synchronous signal generator 60 generates vertical and horizontal synchronizing signals according to a clock signal output from system controller 50 and simultaneously supplies them to a first video signal source 10 and a buffer memory 30. First video source 10 is controlled by the synchronous signals to convert the image of an object into an analog video signal. In other words, first video source 10 consists of a lens, a diaphragm, a color filter and a CCD, wherein the object's image is formed on the CCD via the lens, diaphragm and color filter. The image is then photoelectrically converted and output by the CCD. A video signal output from first video signal source 10 is converted into a digital signal by an analog-to-digital (A/D) converter 20 to be applied to a buffer memory 30. Being controlled by a control signal of system controller 50 input via a first interface 70 and a synchronous signal of synchronous signal generator 60, buffer memory 30 temporarily stores applied video signals by frames. A video signal output from buffer memory 30 is controlled by a control signal of system controller 50 input via a second interface 80 to be written into a predetermined region of a memory card 40. Here, if there is no room to write video signals on memory card 40 or the memory card is not installed, buffer memory 30 stores at least one frame of the video signal, and interrupts the pickup of the next image.

However, the conventional electronic camera can store only analog video signals input via the CCD used in first video signal source 10. That is, since the synchronous signal generated from synchronous signal generator 60 doesn't match the synchronous signal of the video signal output from an external video signal source (for example, from a video tape recorder, a video camera, etc.), proper storage is impossible.

SUMMARY OF THE INVENTION

Therefore, it is an object of the present invention to provide, in an electronic camera which digitizes an analog video signal to write it into a memory device, a video signal recording apparatus capable of writing into the memory device not only a video signal input via a CCD but also a video signal output from another video signal processor.

To accomplish the object, in an electronic camera for recording the image of an object including an A/D converter for converting an input video signal into a digital signal and a storage unit for storing the digital video signal output from the A/D converter at least by fields or by frames, a video signal recording apparatus comprises a system controller, a synchronous signal generator for generating vertical and horizontal synchronous signals according to a clock signal output from the system controller, a first video signal input source including at least a CCD for outputting the image of an object to the A/D converter under control of the synchronous signal generator, a second video signal input source for outputting a second analog video signal to the A/D converter, and a synchronous signal processor, being controlled by the system controller, for selecting one between vertical and horizontal synchronous signals of a video signal output from the second video signal input source and vertical and horizontal synchronous signals from the synchronous signal generator so as to output the selected signals to the storage unit, whereby an input video signal can be written into the storage unit regardless of the video signal source.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 2:
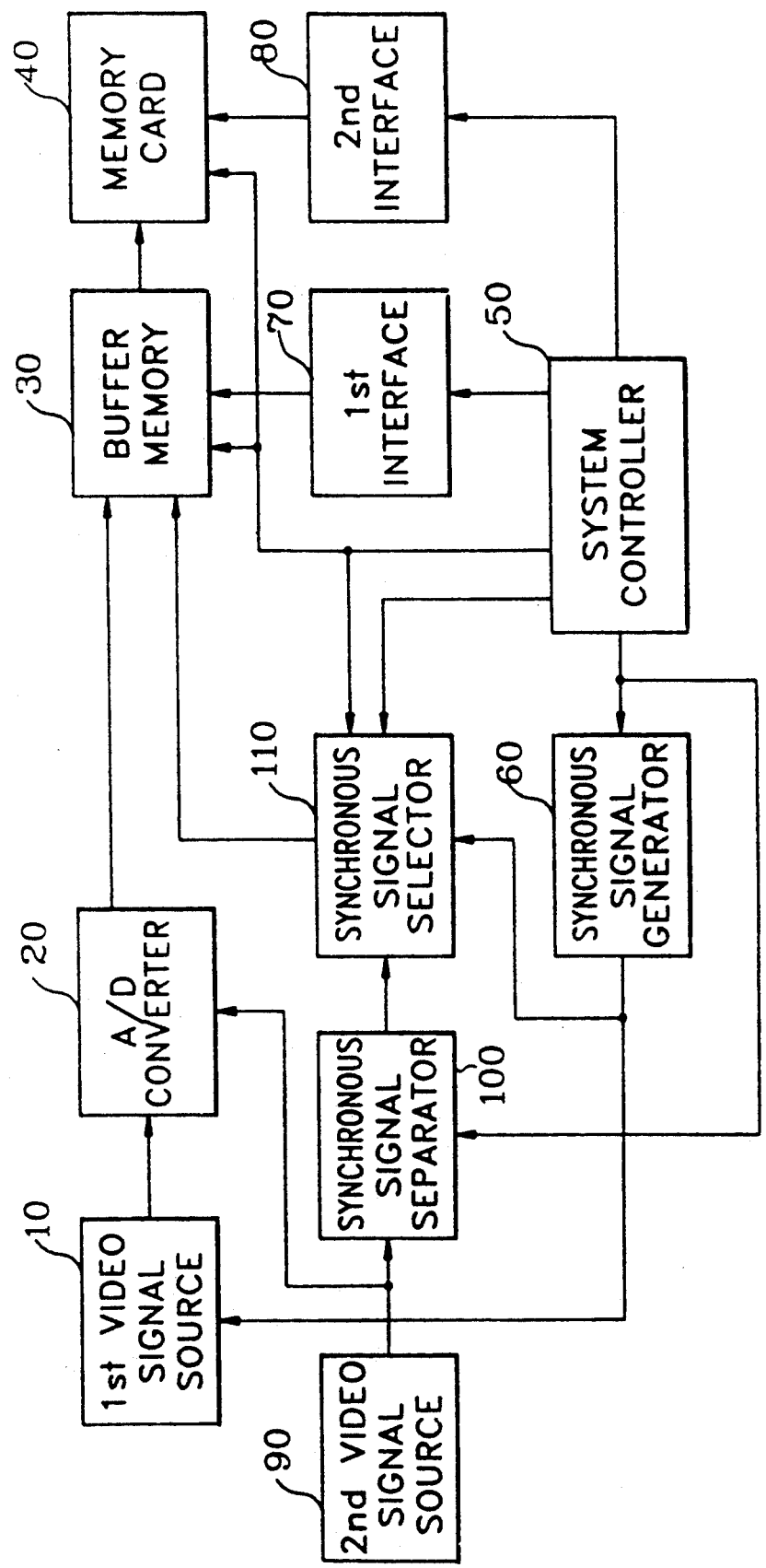
FIG. 2 is a block diagram of an electronic camera according to the present invention.

According to FIG. 2, a video signal applied via another input source as well as that applied via the conventional CCD can be written into a buffer memory and a memory card.

Referring to FIG. 2, the output of a first video signal input source 10 mounted on a conventional electronic camera and for converting the image of an object into a video signal, is connected to a first input of an A/D converter 20. The output of a second video signal source 90 which provides a video signal output from a video signal processor (for example, a video tape recorder, a movie camera, etc.) not mounted on the electronic camera is connected to a second input of A/D converter 20 and a first input of a synchronous signal separator 100. The output of A/D converter 20 is connected to a first input of a buffer memory 30, and the output of synchronous signal separator 100 is connected to a first input of a synchronous signal selector 110. The output of synchronous signal selector 110 is connected to a second input of buffer memory 30. A first output of a system controller 50 is connected to the input of synchronous signal generator 60 and a second input of synchronous signal separator 100. The output of synchronous signal generator 60 is connected to the input of first video signal source 10 and a second input of synchronous signal selector 110. Second and third outputs of system controller 50 are connected to third and fourth inputs of synchronous signal selector 110, a fourth output thereof is connected to the input of a first interface 70, and its fifth output is connected to the input of a second interface 80. The third output of system controller 50 is also connected to a fourth input of buffer memory 30 and a third input of memory card 40. The output of first interface 70 is connected to a third input of buffer memory 30 whose output is connected to a first input of a memory card 40. A second input of memory card 40 is connected to the output of second interface 80.

Figure 3:
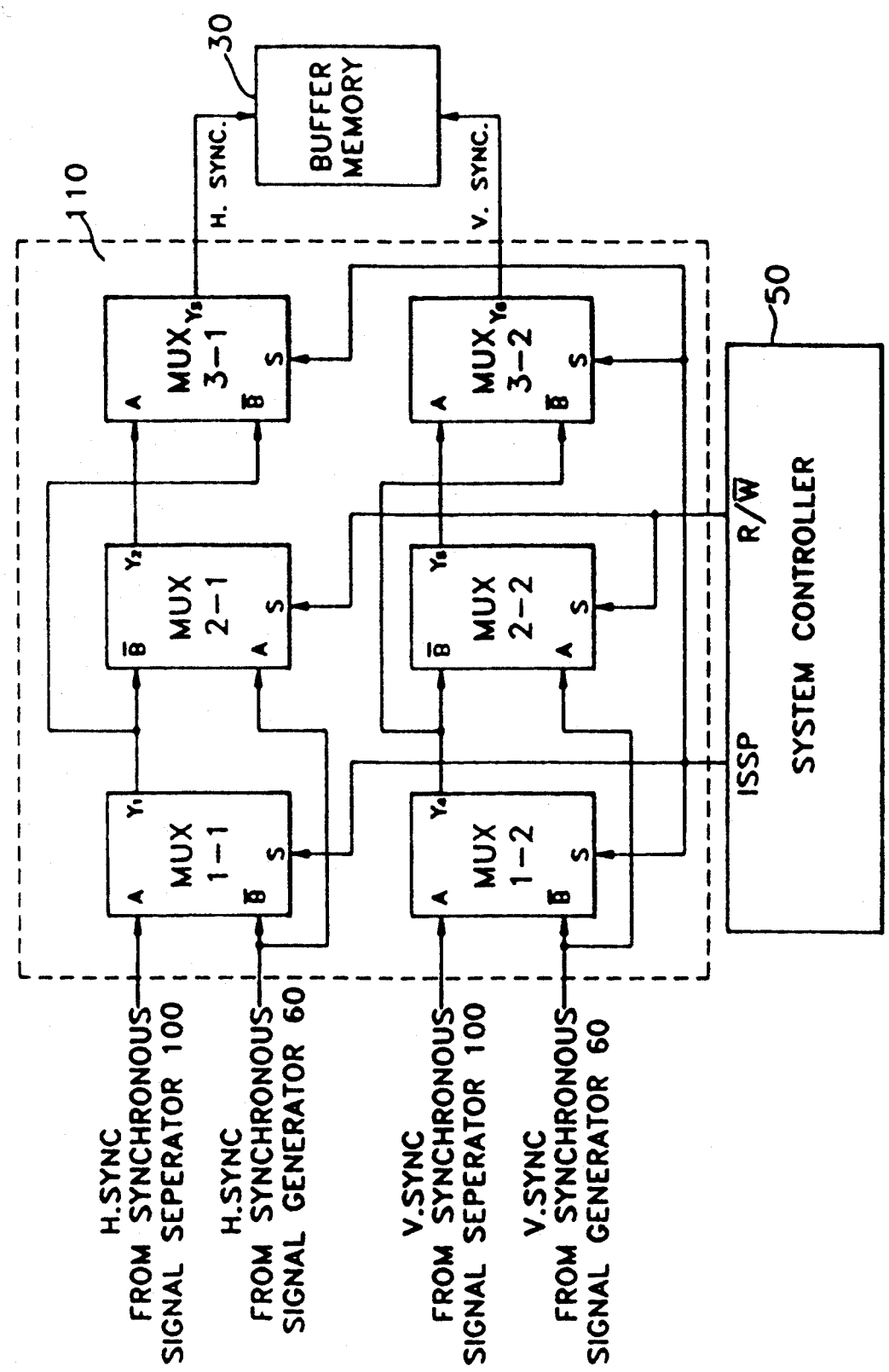
FIG. 3 is a circuit diagram of the synchronous signal selector shown in FIG. 2.

Referring to FIG. 3, a first multiplexer MUX1-1 receives a horizontal synchronous signal from synchronous signal separator 100 at input A and a horizontal synchronous signal from synchronous signal generator 60 at input $\bar{B}$. Select port S of first multiplexer MUX1-1 is connected to the second output, that is, an internal/external video input signal select port, of system controller 50. Input $\bar{B}$ of a second multiplexer MUX2-1 is connected to an output $Y_1$ of first multiplexer MUX1-1. At input A, second multiplexer MUX2-1 also receives the horizontal synchronous signal from synchronous signal generator 60, and its select port S is connected to the third output that is, memory $R/\overline{W}$ port of system controller 50. Input A of a third multiplexer MUX3-1 is connected to an output $Y_2$ of second multiplexer MUX2-1, and its input $\bar{B}$ is connected to output $Y_1$ of first multiplexer MUX1-1. Select port S of third multiplexer MUX3-1 is connected to the second output (internal/external video input signal select port) of system controller 50. An output $Y_3$ of third multiplexer MUX3-1 is connected to the horizontal synchronous signal input of buffer memory 30. A fourth multiplexer MUX1-2 receives a vertical synchronous signal output from synchronous signal separator 100 at input A and a vertical synchronous signal output from synchronous signal generator 60 at input $\bar{B}$. Select port S of fourth multiplexer MUX1-2 is connected to the second output (internal/external video input signal select port ISSP) of system controller 50. Input $\bar{B}$ of a fifth multiplexer MUX2-2 is connected to an output $Y_4$ of fourth multiplexer MUX1-2, and its input A also receives the vertical synchronous signal from synchronous signal generator 60. Select port S of fifth multiplexer MUX2-2 is connected to the third output (memory $R/\overline{W}$ select port) of system controller 50. Input A of a sixth multiplexer MUX3-2 is connected to an output $Y_5$ of fifth multiplexer MUX2-2, input $\bar{B}$ thereof is connected to output $Y_4$ of fourth multiplexer MUX1-2, and its select port S is connected to the second input (internal/external video input signal select port ISSP) of system controller 50. An output $Y_6$ of sixth multiplexer MUX3-2 is connected to the vertical synchronous signal input of buffer 30.

Figure 4A:
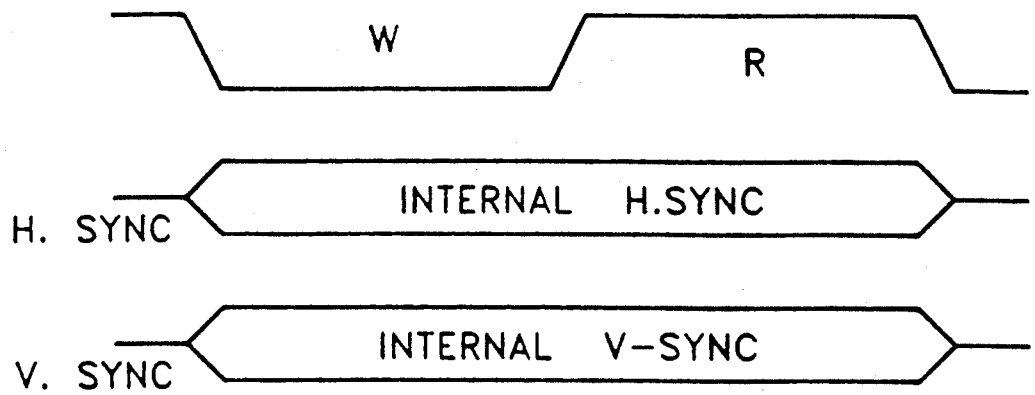
FIGS. 4A and 4B are timing diagrams of vertical and horizontal synchronous signals according to an input video signal of FIG. 2.
Figure 4B:
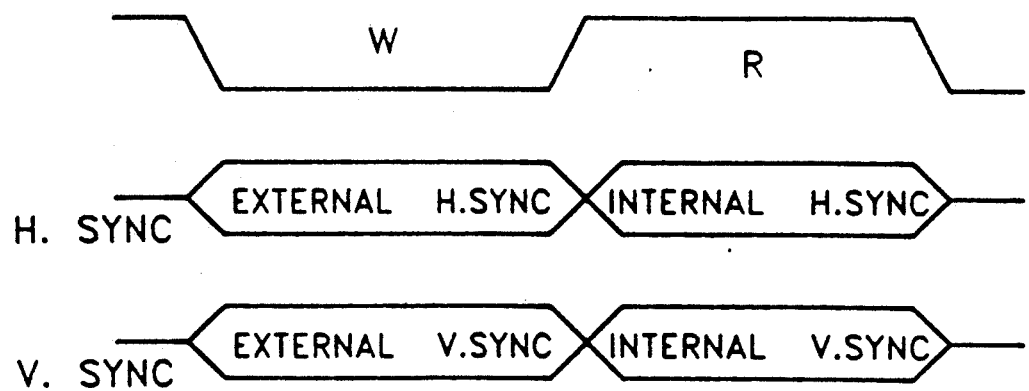

FIGS. 4A and 4B are timing diagrams of vertical and horizontal synchronous signals according to the input video signal of FIG. 2. FIG. 4A illustrates the case when the internal video input source 10 inputs a video signal, and FIG. 4B illustrates the case when the external video input source 90 inputs the video signal.

Operation of FIG. 2 will be described in detail with reference to FIGS. 3, 4A and 4B.

Figure 1:
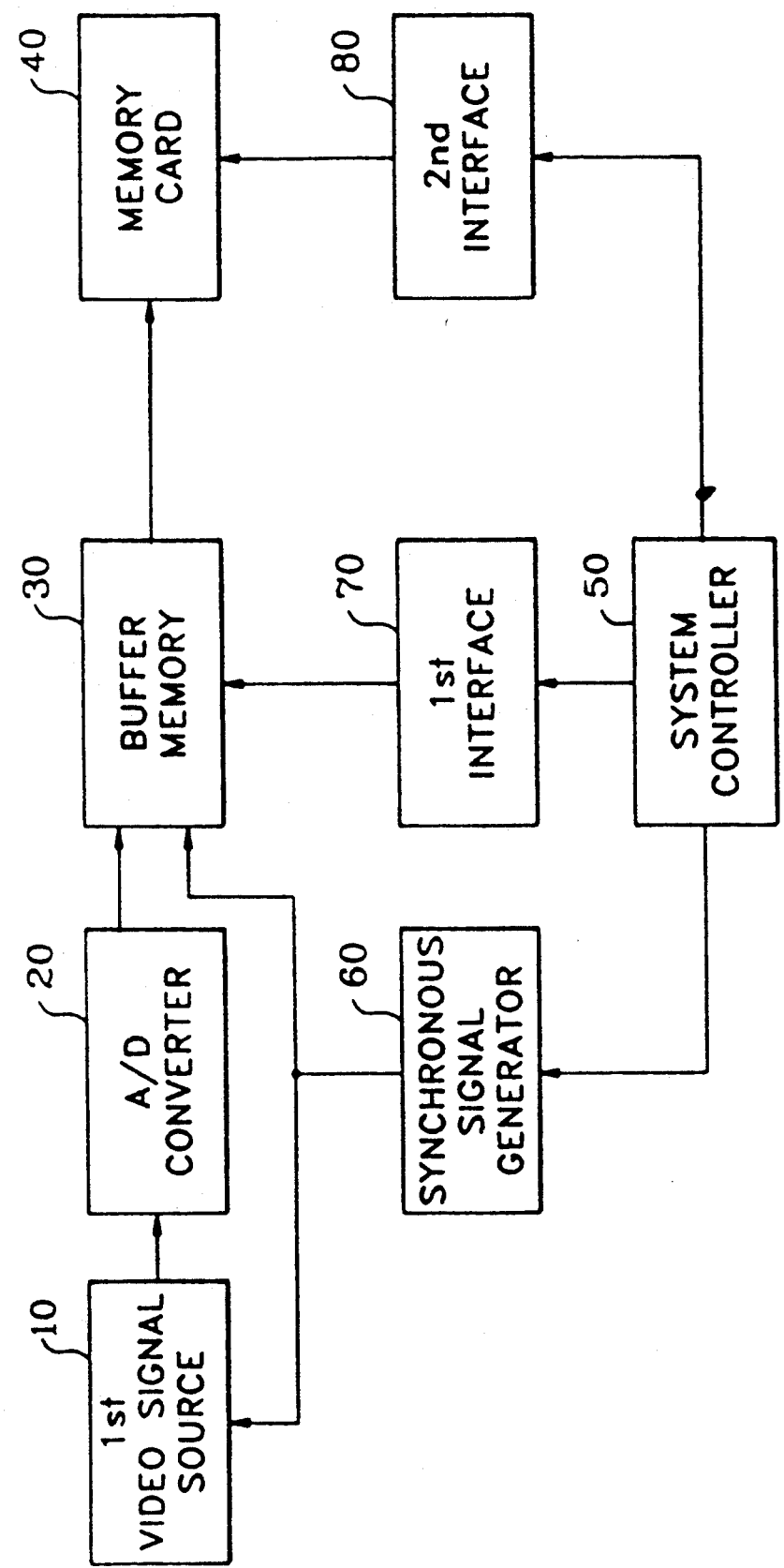
FIG. 1 is a block diagram of a conventional electronic camera.

As mentioned in the description of FIG. 1, first video signal input source 10 is mounted on the electronic camera so as to output the image of an object as a video signal. Second video signal input source 90 is a means for externally inputting a video signal into the electronic camera and corresponds to a system for processing a video signal and outputting it.

Therefore, the present invention has two sets of conditions: when writing a video signal generated from an internal means into buffer memory 30 and memory card 40 and when writing a video signal fed by an external means into buffer memory 30 and memory card 40.

When a video signal generated from the internal means is written, a clock output from the first output of system controller 50 is fed to synchronous signal generator 60 to generate a synchronous signal. Synchronous signal generator 60 simultaneously supplies both horizontal and vertical synchronous signals generated by the applied clock to the input of first video signal input source 10 and the second input of synchronous signal selector 110. The synchronous signals input to first video signal input source 10 is fed to a timing generator (not shown) for driving a CCD incorporated within the first video signal input source. The applied synchronous signal synchronizes the timing generator which in turn feeds a clock to the CCD. The CCD converts the object's image into a video signal to transmit it to A/D converter 20. A/D converter 20 converts the applied video signal into a digital signal to feed it to buffer memory 30.

Horizontal and vertical synchronous signals output from synchronous signal generator 60 and input to the second input of synchronous signal selector 110 are fed to the $\bar{B}$ inputs of first and fourth multiplexers MUX1-1 and MUX1-2, respectively. A low logic signal is output from the second output (internal/external video input signal select port ISSP) of system controller 50 to the select ports of first and fourth multiplexers MUX1-1 and MUX1-2, causing them to output the horizontal and vertical signals of synchronous generator 60 via outputs $Y_1$ and $Y_4$, respectively. The output horizontal and vertical synchronous signals are supplied to $\bar{B}$ inputs of second and fifth multiplexers MUX2-1 and MUX2-2, respectively. Horizontal and vertical synchronous signals from synchronous signal generator 60 are also supplied to the A inputs of second and fifth multiplexers MUX2-1 and MUX2-2. Accordingly, regardless of the logic of the signal output from the third output (memory $R/\overline{W}$ select port) of system controller 50, the signal output via outputs $Y_2$ and $Y_5$ are horizontal and vertical synchronous signals from synchronous signal generator 60. Similarly, since the signals applied to inputs A and $\bar{B}$ of third and sixth multiplexers MUX3-1 and MUX3-2 are also horizontal and vertical synchronous signals from synchronous signal generator 60, signals output from outputs $Y_3$ and $Y_6$ to buffer memory 30 are horizontal and vertical synchronous signals from synchronous signal generator 60. The digital video signal output from A/D converter 20 is controlled by horizontal and vertical synchronous signals selected by synchronous selector 110 and output from synchronous generator 60 together with control signals from system controller 50, to be written into buffer memory 30. These control signals from system controller 50 are the $R/\overline{W}$ control signal output from its third output and a signal received from its fourth output via first interface 70. The signal output via first interface 70 could be, for instance, an address designation signal for writing or reproducing operations.

The digital video signal written in buffer memory 30 is then applied to memory card 40. Memory card 40 is also controlled by system controller 50 as is buffer memory 30. In other words, writing or reading state of memory card 40 is determined by the $R/\overline{W}$ control signal output from the third output of system controller 50 and the address of a written or read signal is designated by an address designation signal output via second interface 80. Here, system controller 50 controls memory card 40 so that it writes at the same time as when buffer memory 30 is controlled to read.

When a video signal is output from second video signal input source 90, it is simultaneously input to both the second input of A/D converter 20 and the first input of synchronous signal separator 100. The video signal input to A/D converter 20 is converted into a digital signal to be fed to the first input of buffer memory 30.

Meanwhile, being controlled by a separation control signal output from the first output of system controller 50 into the second input of synchronous signal separator 100, the video signal input to the first input of synchronous signal separator 100 is detected so that only its horizontal and vertical signals are output to the first input of synchronous selector 110. Meanwhile, synchronous signal generator 60 outputs horizontal and vertical signals to the second input of synchronous selector 110.

When these horizontal and vertical synchronous signals from synchronous signal separator 100 and synchronous signal generator 60 are input to inputs A and $\overline{B}$ of first and fourth multiplexers MUX1-1 and MUX1-2, synchronous signal selector 110 selects an output signal according to the logic signal applied to the select ports. Since this is the case for selecting an outer video input signal, the logic state of a signal output from the second output (internal/external video input signal select port) of system controller 50 is high. Thus, signals output from output $Y_1$ of first multiplexer MUX1-1 and output $Y_4$ of fourth multiplexer MUX1-2 are horizontal and vertical synchronous signals from synchronous signal separator 100. The output horizontal and vertical synchronous signals are input to the $\overline{B}$ inputs of second and fifth multiplexers MUX2-1 and MUX2-2, and horizontal and vertical synchronous signals from synchronous signal generator 60 are input to the A inputs of second and fifth multiplexers MUX2-1 and MUX2-2, respectively. When a video signal output from A/D converter 20 is written into buffer memory 30, since the logic state of a signal output from the third output (memory R/$\overline{W}$ select port) of system controller 50 is low, horizontal and vertical synchronous signals output from synchronous signal separator 100 and input via the $\overline{B}$ inputs of the second and fifth multiplexers are output via outputs $Y_2$ and $Y_5$. The output signals are input to the A inputs of third and sixth multiplexers MUX3-1 and MUX3-2, respectively. Since the currently output signals of first and fourth multiplexers MUX1-1 and MUX1-2 are also input to the $\overline{B}$ inputs of multiplexers MUX3-1 and MUX3-2, synchronous signals applied to the second input of buffer memory 30 are horizontal and vertical synchronous signals from synchronous signal separator 100, regardless of the logic state of a signal applied to their select ports S.

Meanwhile, when a video signal stored in buffer memory 30 is read out and written into memory card 40, since the logic state of a signal output from the third input (memory R/$\overline{W}$ port) of system controller 50 and input to the select ports S of second and fifth multiplexers MUX2-1 and MUX2-2 is high, signals output via outputs $Y_2$ and $Y_5$ are horizontal and vertical synchronous signals output from synchronous signal generator 60 and input via their A inputs. Therefore, synchronous signals applied to inputs A of third and sixth multiplexers MUX3-1 and MUX3-2 are horizontal and vertical synchronous signals from synchronous signal generator 60. Since a control signal output from the second output of system controller 50 to select ports S of second and fifth multiplexers MUX1-2 and MUX2-2 is also high (due to the external video input signal being selected in this case), signals from outputs $Y_3$ and $Y_6$ are horizontal and vertical synchronous signals from synchronous signal generator 60. The relationship of the operational waveforms is illustrated in FIG. 4B.

As described above in detail, in an electronic camera for photographing and recording the image of an object, the video signal recording apparatus of the present invention is capable of controlling both a synchronous signal of an analog video signal input via a CCD incorporated in the electronic camera and a synchronous signal of an analog video signal input via an external video signal source, thereby enabling to photograph and record an applied video signal regardless of the video input source.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. In an electronic camera for recording the image of an object including an A/D converter for converting an input video signal into a digital signal and a storage unit for storing the digital video signal output from said A/D converter at least by fields or by frames, a video signal recording apparatus comprising:

a system controller;

a synchronous signal generator for generating vertical and horizontal synchronous signals according to a clock signal output from said system controller;

a first video signal input means including at least a CCD for outputting the image of an object to said A/D converter under the control of said synchronous signal generator;

a second video signal input means for outputting a second analog video signal to said A/D converter; and a synchronous signal processor, being controlled by said system controller, for selecting one between vertical and horizontal synchronous signals of a video signal output from said second video signal input means and vertical and horizontal synchronous signals from said synchronous signal generator so as to output the selected signals to said storage unit, whereby an input video signal can be written into said storage unit regardless of the video signal input means.

2. The video signal recording apparatus as claimed in claim 1, wherein said synchronous signal processor comprises:

a synchronous signal separator for detecting and separating vertical and horizontal synchronous signals from a video signal output from said second video signal input means;

a synchronous signal selector, being controlled by said system controller, for selecting one between vertical and horizontal synchronous signals from said synchronous signal separator and vertical and horizontal synchronous signals from said synchronous signal generator so as to output the selected signals to said storage unit.

3. The video signal recording apparatus as claimed in claim 2, wherein said synchronous signal selector comprises:

at least three parallel multiplexers for receiving vertical synchronous signals output from said synchronous signal separator and said synchronous signal generator at separate inputs and receiving an output from said system controller at another input so as to output a selected vertical synchronous signal; and at least three parallel multiplexers for receiving horizontal synchronous signals output from said synchronous signal separator and said synchronous signal generator at separate inputs and receiving an output from said system controller at another input so as to output a selected horizontal synchronous signal.

* * * * *

UNITED STATES PATENT AND TRADEMARK OFFICE
CERTIFICATE OF CORRECTION

PATENT NO. : 5,225,908
DATED : July 6, 1993
INVENTOR(S) : Young-man Lee

It is certified that error appears in the above-indentified patent and that said Letters Patent is hereby corrected as shown below:

IN THE TITLE PAGE

Title Page, Primary Examiner, Change "Groddy" to --Groody-- .

Signed and Sealed this

Fifteenth Day of November, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,225,908
DATED : July 6, 1993
INVENTOR(S) : Young-Man Lee

It is certified that error appears in the above-indentified patent and that said Letters Patent is hereby corrected as shown below:

IN THE TITLE PAGE

Primary Examiner, change "Groddy" to --Groody-- .

Signed and Sealed this

Twenty-eighth Day of October, 1997

Attest:

BRUCE LEHMAN

Attesting Officer     *Commissioner of Patents and Trademarks*